(12) United States Patent
Epple

(10) Patent No.: US 12,320,956 B2
(45) Date of Patent: Jun. 3, 2025

(54) OPTICAL ARRANGEMENT WITH AN OVERVIEW FUNCTION FOR A CATADIOPTRIC MICROSCOPE OBJECTIVE

(71) Applicant: Carl Zeiss AG, Oberkochen (DE)

(72) Inventor: Alexander Epple, Aalen (DE)

(73) Assignee: Carl Zeiss AG, Oberkochen (DE)

(*) Notice: Subject to any disclaimer, the term of this patent is extended or adjusted under 35 U.S.C. 154(b) by 0 days.

(21) Appl. No.: 18/209,458

(22) Filed: Jun. 13, 2023

(65) Prior Publication Data
US 2023/0400667 A1    Dec. 14, 2023

(30) Foreign Application Priority Data
Jun. 13, 2022   (DE) ...................... 10 2022 114 813.0

(51) Int. Cl.
    G02B 13/00    (2006.01)
    G02B 9/12     (2006.01)
    (Continued)

(52) U.S. Cl.
    CPC ........... *G02B 13/0015* (2013.01); *G02B 9/12* (2013.01); *G02B 17/0808* (2013.01); *G02B 17/0856* (2013.01); *G02B 21/04* (2013.01)

(58) Field of Classification Search
    CPC ........... G02B 17/0804; G02B 17/0808; G02B 17/0856; G02B 13/0015; G02B 19/12
    (Continued)

(56) References Cited

U.S. PATENT DOCUMENTS

| 1,582 A | * | 5/1840 | Wolcott ................. G03B 17/17 |
| | | | 396/351 |
| 6,357 A | | 4/1849 | Van Bunschoten et al. |

(Continued)

FOREIGN PATENT DOCUMENTS

| CN | 102520506 A | 6/2012 |
| CN | 102538965 A | 7/2012 |

(Continued)

OTHER PUBLICATIONS

Machine translation of DE 3,909,336 retrieved electronically from PE2E Search Dec. 6, 2023 (Year: 2023).*

(Continued)

*Primary Examiner* — Cara E Rakowski
(74) *Attorney, Agent, or Firm* — Ewers IP Law PLLC; Falk Ewers

(57) ABSTRACT

An optical arrangement having a center axis, an object side, an image side, and a catadioptric arrangement is provided. The catadioptric arrangement includes first and second partly reflective optical components, the first optical component including radially inner and radially outer regions, the inner region being configured to be transparent to light incident from the object side, and the outer region being configured to reflect light incident from the object side, the second optical component including a radially inner region and a radially outer region, the outer region being configured to be transparent to light incident from the object side, and the inner region being configured to be transparent to light incident from the object side and to reflect light incident from the image side. At least one further optical component with positive refractive power is arranged at the inner region of the second optical component on the object side.

18 Claims, 7 Drawing Sheets

(51) Int. Cl.
*G02B 17/08* (2006.01)
*G02B 21/04* (2006.01)

(58) Field of Classification Search
USPC .................................. 359/729, 730, 731
See application file for complete search history.

(56) References Cited

U.S. PATENT DOCUMENTS

| | | | |
|---|---|---|---|
| 256,148 A | 4/1882 | Lefeuvrier | |
| 3,438,695 A * | 4/1969 | Matsui | G02B 17/0884 359/731 |
| 3,679,290 A | 7/1972 | Adams et al. | |
| 4,106,855 A * | 8/1978 | Coon | G02B 17/0884 250/353 |
| 4,342,503 A | 8/1982 | Shafer | |
| 4,714,307 A | 12/1987 | Palmer | |
| 4,950,056 A * | 8/1990 | Smith | G02B 17/0808 359/211.2 |
| 5,161,051 A * | 11/1992 | Whitney | G02B 17/0852 359/357 |
| 5,715,023 A | 2/1998 | Hoppe | |
| 5,930,055 A | 7/1999 | Eisenberg | |
| 6,169,637 B1 | 1/2001 | Tsunashima | |
| 6,449,103 B1 | 9/2002 | Charles | |
| 6,560,039 B1 | 5/2003 | Webb et al. | |
| 7,643,225 B1 | 1/2010 | Tsai | |
| 10,877,244 B1 | 12/2020 | Chen et al. | |
| 2003/0218801 A1* | 11/2003 | Korniski | G02B 17/0888 359/399 |
| 2008/0019022 A1 | 1/2008 | Mitchell | |
| 2013/0265507 A1* | 10/2013 | Ford | G02B 17/0808 349/13 |
| 2015/0177496 A1 | 6/2015 | Marks et al. | |
| 2017/0068105 A1* | 3/2017 | Yun | G02B 27/286 |
| 2018/0180862 A1 | 6/2018 | Lu | |
| 2019/0162941 A1 | 5/2019 | Maezawa | |
| 2019/0187446 A1 | 6/2019 | Dai et al. | |
| 2020/0004001 A1* | 1/2020 | Sinclair | G02B 17/0888 |
| 2020/0249445 A1* | 8/2020 | Hu | G02B 13/02 |
| 2021/0208376 A1* | 7/2021 | Lin | G02B 17/0896 |
| 2022/0099949 A1 | 3/2022 | Iwane et al. | |

FOREIGN PATENT DOCUMENTS

| | | | |
|---|---|---|---|
| CN | 104181675 A | 12/2014 | |
| CN | 105759410 A | 7/2016 | |
| CN | 109557649 A | 4/2019 | |
| DE | 2157058 A1 | 5/1973 | |
| DE | 3909336 C2 * | 8/1994 | ............ G02B 17/08 |
| DE | 102007019101 A1 * | 10/2008 | ............ F41G 7/008 |
| DE | 102014108596 B3 | 10/2015 | |
| GB | 1074503 A | 7/1967 | |
| GB | 2212936 A * | 8/1989 | ......... G02B 13/146 |
| JP | 2018109673 A | 7/2018 | |
| WO | WO-2017199557 A1 * | 11/2017 | ............ G02B 13/02 |

OTHER PUBLICATIONS

Machine translation of WO 2017/199557 retrieved electronically from PE2E Search Dec. 6, 2023 (Year: 2023).*

Machine translation of DE 10 2007 019 101 retrieved electronically from PE2E Search Dec. 6, 2023 (Year: 2023).*

Jena et al., "Mikroskopobjektiv", Lexikon der Optik, Spektrum Akademischer Verlag, Heidelberg, Germany (1999), and English language translation thereof, available at https://www.spektrum.de/lexikon/optik/mikroskopobjektiv/2067.

Switz et al., "Low-Cost Mobile Phone Microscopy with a Reversed Mobile Phone Camera Lens", Plos One, vol. 9, Issue 5, e95330 (May 22, 2014), Department of Bioengineering & Biophysics Graduate Group, University of California, Berkeley, California, United States, in English.

Diederich et al., "Using machine-learning to optimize phase contrast in a low-cost cell-phone microscope", Plos One, vol. 13, Issue 3, e0192937, (Mar. 1, 2018), Göttingen, Germany, in English, available at https://doi.org/10,137/journal.pone.0192937.

Botcherby et al., "Aberration-free optical refocusing in high numerical aperture microscopy", Optics letters, vol. 32, No. 14, p. 2007-2009 (Jul. 3, 2007), Department of Engineering Science, University of Oxford, Parks Road, Oxford, OX1 3PJ, United Kingdom, in English.

McGuire et al., "Manufacturable mobile phone optics: higher order aspheres are not always better", Proceedings of SPIE, SPIEDigitalLibrary.org/conference-proceedings-of-spie, Proc.SPIE 7652, International Optical Design Conference 2010, 76521O (Sep. 9, 2010), doi: 10.1117/12.871016, Wyoming, United States, in English.

German Office Action issued in German Patent Application No. DE 10 2022 114 813.0, dated Feb. 13, 2023 (from which this application claims priority) and English language translation thereof.

Decision to Grant issued in German Patent Application No. DE 10 2022 114 813.0, dated Mar. 28, 2023 (from which this application claims priority) and English language translation thereof.

U.S. Appl. No. 18/209,456, filed Jun. 13, 2023, Alexander Epple.

Chinese Office Action and Search Report issued on Mar. 8, 2024, in Chinese counterpart application No. 202310694458.0 and English-language translation thereof.

Office Action dated Nov. 6, 2024 issued in Chinese counterpart application No. 202310694458.0 and English-language translation thereof.

Marks et al "Wide-field compact catadioptric telescope spanning 0.7-14 μm wavelengths" Applied Optics, vol. 52, No. 18, pp. 4334-4342, Jun. 20, 2013 (Year: 2013).

Wikipedia webpage "Camera lens" (Year: 2021).

Quora https://www.quora.com/Why-are-camera-lenses-measured-in-millimeters/answer/Joseph-Finkleman?comment_id= 83603571 &comment_type=2 (Year: 2020).

Office Action dated Mar. 12, 2025, issued in Chinese counterpart application No. 202310694458.0 and English-language translation thereof.

* cited by examiner

OPTICAL ARRANGEMENT WITH AN OVERVIEW FUNCTION FOR A CATADIOPTRIC MICROSCOPE OBJECTIVE

CROSS REFERENCE TO RELATED APPLICATIONS

This application claims priority to German patent application DE 10 2022 114 813.0, filed Jun. 13, 2022, the entire content of which is incorporated herein by reference.

TECHNICAL FIELD

The present disclosure relates to an optical arrangement, an objective, in particular for a microscope, a camera and/or a projector, an image capture apparatus, an image reproduction apparatus and a device, in particular a mobile device.

BACKGROUND

Mobile devices have cameras in many applications, especially cellular telephones, tablets, netbooks or notebooks. In particular, virtually every modern cellular telephone includes one or more integrated cameras that allow high-quality images or videos to be recorded. These cameras are attached virtually exclusively to the front side and back side, with the optical axis of the associated optics being aligned perpendicular to the said front side and back side. As a consequence, the installation length of the optical system is specified by the thickness of the mobile device. In this context, 6 mm to 8.5 mm are typical values. An optical system with a focal length comparable to the length of the installation space can be realized in this installation space. The telephoto factor F specifying the ratio of the installation length TT to the focal length f'($F=TT/f'$) is virtually 1. Telephoto structures with a focal length longer than the installation space, or with $F<1$, or retrofocus structures where the focal length is shorter than the installation space, or $F>1$, can only be realized with great difficulties. If the goal is to significantly increase the focal length of the optics, it is necessary to search for a way of artificially increasing the installation length of the objective.

In the context of mobile devices, the option of being able to produce microscopic image representations using these cameras is of interest. A large working distance on the object should be realizable in order to ensure good illumination. Moreover, the object should be imaged with an imaging scale close to 1:1. What follows from the two requirements is that the installation length of the objective is comparable to the front working distance and consequently typically exceeds the conventional installation space in mobile devices. Thus, a concept for realizing a long focal length or installation length in a short installation space is sought after. This can be achieved by folding the optical beam path. This fold should typically be along the optical axis. In particular, microscope objectives can be configured as mirror objectives (catadioptric objectives). In this respect, the prior art is disclosed in "Lexikon der Optik—Mikroskopobjektiv" https://www.spektrum.de/lexikon/optik/mikroskopobjektiv/2067, U.S. Pat. No. 10,877,244 B1, US 2019/0187446 A1, U.S. Pat. Nos. 6,169,637 B1 and 5,930,055 A.

To generate microscopic image representations within the context of mobile applications, however, the object field of the typically used optical units is very small, with a diagonal of approximately 5 mm, due to the large magnification (virtually 1:1) of the imaging. A user finds it correspondingly difficult to bring the object of interest into the image center of the image field in each case, especially since the object is largely behind the housing of the mobile device, for example the cellular telephone.

SUMMARY

Against this background, it is an object of the present disclosure to provide an advantageous optical arrangement. Further objects are to provide an advantageous objective, an advantageous image capture apparatus, an advantageous image reproduction apparatus, and an advantageous mobile device. These objects are achieved by an optical arrangement, an objective, an image capture apparatus, an image reproduction apparatus, and a device, as described herein.

The optical arrangement according to an aspect of the disclosure includes a center axis, which may coincide with an optical axis of the optical arrangement, an object side, an image side, and a catadioptric arrangement. The object side is understood to be the side facing the object to be imaged. The image side is understood to be the side facing the produced image representation, in particular the image surface, for example an image plane. The catadioptric arrangement includes a first, partly reflective optical component and a second, partly reflective optical component, which are arranged in succession, especially one behind the other in the direction of the center axis, in the beam path along the center axis so that the first optical component is arranged on the image side of the second optical component. Typically, the first, partly reflective optical component includes a front side, which is the object side of the component, which is to say the side facing the object to be imaged, for example an object-side surface, and a back side, which is the image side of the component, which is to say the side facing the produced image representation, for example an image-side surface. In the present context, partly reflective means that the corresponding component includes at least one region which is configured to be reflective or to reflect, and at least one region which is configured to be non-reflective.

In relation to the center axis, the first optical component includes a radially inner region and a radially outer region. In this case, the inner region is configured to be partly transparent to, or at least partly transmit, light incident from the object side, and the outer region is configured to reflect light incident from the object side. In relation to the center axis, the second optical component likewise includes a radially inner region and a radially outer region. The outer region of the second optical component is configured to be transparent to, or transmit, light incident from the object side, and the inner region is configured to be at least partly transparent to, or at least partly transmit, light incident from the object side and to reflect light incident from the image side. At least one further optical component, in particular an optical element, with positive refractive power is arranged at the inner region of the second optical component on the object side.

The optical arrangement according to an aspect of the disclosure is advantageous in that, while using the same optics and the same detector, the said optical arrangement allows realization of both a microscopic image representation and an overview image representation with a reduced magnification. This is realized in the form of a two-position optical unit, which can discretely change back and forth between two different imaging scales. In particular, a half object field diagonal of 2.4 mm in the case of a working distance of 25 mm can be realized for a microscopic image representation, corresponding to a half field angle of more or less 6°. A half field angle of approximately 20° can be realized for the overview, corresponding to approximately three times the field angle of the microscopic image representation.

The back side of the first optical component is typically configured to be partly reflective. The front side of the first optical component and the non-reflective part can be configured to be transparent or transmissive. The front side or the back side of the second optical component can be configured to be partly reflective. The respective other side, which is to say the back side when the front side is partly reflective, and the respective non-reflective part can be configured to be transparent or transmissive. Advantageously, the partly reflective region of the first optical component has a concave configuration on the object side. Likewise advantageously, the partly reflective region of the second optical component has a convex configuration on the image side.

The further optical component typically has a positive refractive power in the range of $L/4 < f1 < L/1.5$, where L is the vertex distance of the object-side face of the further optical component from the image plane and f1 is the focal length of the further optical component. Let r1 and r2 be the object-side vertex radium and image-side vertex radius of this further optical component. $L/5 < r1 < L/2$ may apply, where the image-side vertex radius r2 may in this case be designed in the same way as that of the reflective inner region of the second optical component (=2nd reflection). A corresponding refractive power is advantageous in that a high-quality overview image representation can be generated.

The further optical component can be attached, typically connected, in particular securely connected, to the inner region of the second optical component on an object-side front side of the second optical component. For example, the further optical component may be cemented onto the inner region of the second optical component on the front side. The further optical component may include a plurality of lenses. It may include at least one lens made of crown-like material.

Furthermore, at least one first and one second refractive and/or diffractive surface with refractive power may be arranged in the beam path between the image side of the first optical component and the object side of the second optical component. By way of example, at least one third optical component may be arranged geometrically, and in the beam path, between the first optical component and the second optical component. The at least one third optical component may have a refractive and/or diffractive configuration and/or may be designed to correct at least one imaging aberration. In this way, it is possible to increase the imaging quality of the image representations produced.

For signal separation purposes, the inner region of the second optical component may be designed as a beam splitter in a first variant. In this case, the inner region of the second optical component may be configured to be at least partly transparent to, or at least partly transmit, light incident from the object side and to partly reflect light incident from the image side, for example be configured to be transmissive and reflective to the same extent. In particular, the inner region can be designed so that it reflects a fixed percentage of light and transmits the remaining percentage of light. In particular, the inner region can be designed so that between 30 percent and 70 percent of the light is transmitted and between 70 percent and 30 percent of the light is reflected. Typically, the ratio is between 40 percent to 60 percent and 60 percent to 40 percent. For example, it can be approximately 50 percent to approximately 50 percent, in the case of which therefore approximately 50 percent of the incident light is reflected, and 50 percent is transmitted. In these variants, both the light from the channel for a microscopic image representation and the light from the overview channel simultaneously reach an image plane or a detector and are superposed on one another.

For signal separation purposes, the optical arrangement may include an optical component part, for example in the form of a layer or a plane-parallel plate, which is configured to be switchable between a transmitting state and an opaque state, for example a reflective and/or absorbing state, and which is designed to control the transmission and/or reflection of light by the inner and the outer region of the second optical component. The optical component part may be arranged in front of the second optical component on the object side or may be integrated into the second optical component or may be arranged between the first and the second optical component.

In an exemplary configuration, the optical component part includes a plurality of regions which are arranged radially with respect to one another, for example in ring-shaped fashion, in relation to the center axis and which can each be switched independently of one another between a transmitting state and an opaque state, for example an absorbing state and/or a reflective state. A corresponding switchable layer may be configured as an LCD array.

For example, the optical component part may have a radially inner region and a radially outer region, with, in particular, the inner region being able to be congruent with the inner region of the second optical component and the outer region being able to be congruent with the outer region of the second optical component, which are switchable into two mutually deviating states. The respective region may be transmissive in a first state and opaque in a second state. Thus, for example by way of applying a switching voltage, the inner region can be switched to be transmissive while the outer region is switched to be opaque, and vice versa. In this way, one or the other signal can be superimposed or masked in alternation. If the outer region is set to be transparent and the inner region is set to be opaque, then the microscopic signal may enter the system while the overview signal is blocked. If the outer region is set to be opaque and the inner region is set to be transparent, then the overview signal may enter the system while the microscopic signal is blocked.

Furthermore, the optical component part may include an intermediate region arranged between the radially inner region and the radially outer region. The intermediate region may be set to be permanently opaque, for example by being stained black. This can ensure precise signal separation. At the same time, an allowance is made for the fact that the switchable layer cannot be situated exactly in the respective entrance pupil planes of the overview channel and microscopic channel.

In a second variant for signal separation, the inner region of the second optical component can be designed such that it reflects light of a first defined wavelength range, for example a wavelength range in the range of visible light (i.e., in the wavelength range of approximately 400-800 nm), and transmits light of a second defined wavelength range, for example a wavelength range in the range of near infrared light (at approximately 1000 nm). To this end, the inner region may be embodied with a wavelength-selective dielectric layer. For example, the latter may have a high reflectance in the visual wavelength range but also have a very high transmission in the near infrared wavelength range. Then, both the microscopic signal and the overview signal may reach an image plane or a corresponding detector.

There, the signal of the overview image representation and the signal of the microscopic image representation can be separated in two different ways. In a first variant, in which the microscopic signal and overview signal are received and represented at the same time, it is possible to use a detector which also includes pixels sensitive in the near infrared range in addition to the standard visual colors, for example green, red, blue. In a second variant, an appropriate color filter, which either blocks (microscopic image representation) or transmits (overview image representation) the near infrared signal, may be arranged in front of the detector or in place of an entrance window.

In a third variant, the inner region of the second optical component can be configured so that it reflects light of a first defined polarization state and transmits light of a second defined polarization state. In this case, a polarization-selective layer may be arranged on the inner region of the second optical component, the said layer for example reflecting one polarization state while transmitting another. All mutually orthogonal polarization states are possible as polarization states, which is to say, for example, mutually perpendicular linear polarizations or right-handed and left-handed circular polarization.

The polarization states can be set for example on the object side, for example on an entrance window, using a suitable polarization mask or a polarizing mask, the characteristic of which is formed within the sense of the outer region of the entrance window, which is configured to be geometrically congruent with the outer region of the second optical component, establishing a first polarization of the entering light and the inner region of the entrance window, which is configured to be geometrically congruent with the inner region of the second optical component, establishing a second polarization of the entering light. It is then possible to distinguish between the two signals by way of a suitable choice of an analyzer upstream of the detector. In the case of signal separation by circular polarization, the inner region of the second optical component, for example a reflective layer on the front side of the second optical component, may include a chiral layer or may be designed with cholesteric liquid crystals (CLC). Examples in this respect are described in U.S. Pat. Nos. 5,715,023 A and 3,679,290 A.

A fourth variant of signal separation has a channel separation by way of a suitable choice of the system stop. To this end, the inner region of the second optical component may have a radially outer region which is configured, or acts, as an aperture stop. The optical signals of the two imaging channels, which is to say the beam path for a microscopic image representation and the beam path for an overview image representation jointly use the optical elements between the reflective region, which is to say the inner region of the second optical element, and an object plane or detector. In this case, signal separation can be implemented at the inner region of the second optical component. The microscopic signal is reflected here, while the overview signal is transmitted. If the system stop for the microscopic channel is on this surface, then the beams of all field points that are imaged exactly coincide. On account of the obscured imaging, the reflective coating of the inner region of the second optical component can be designed as a ring-shaped layer with a strictly defined outer edge and a strictly defined inner edge since the inner region of the beams does not contain any light in any case on account of the obscuration. Thus, in this variant, the front side of the second, partly reflective optical component contains a layer which is divided into three ring zones, specifically an outer region configured to be non-reflective in order to allow the microscopic signal to enter the system, a central ring zone (also referred to as outer radial region of the inner region above) which is reflective in this variant in order to once again reflect the microscopic signal following the reflection at the first, partly reflective optical component, and the innermost center or the inner region which is ultimately non-reflective again, in order to introduce the overview signal into the optical system within the pupil obscuration of the microscopic system.

An advantage of this variant is in the fact that a very high transmission is realizable for both the microscopic channel and the overview channel since the signals are geometrically separated. However, displacing the system stop from the entrance region of the optical arrangement to the region of the second reflection leads to increased obscuration in the microscopic channel.

The variants described can also be combined with one another as desired. The signals of the microscopic image representation and the overview image representation can be precisely separated from one another by way of the described variants. This is advantageous, in particular, in that the same detector can be used for both image representations. Thus, the optical arrangement is advantageously configured to be switchable between a first state, for example a microscope state for producing a microscopic image representation, and a second state, for example an overview state for producing an overview image representation, with the object-side chief ray angle being at least two times larger in the second state than in the first state.

The optical arrangement may have a linear obscuration of between 30 percent and 50 percent, for example between 35 percent and 40 percent.

The optical components may be configured to be rotationally symmetric. An air lens (air-filled distance) may be arranged between at least two optical components. The entrance pupil of the first state, which is to say of the microscope channel, may have an extent of between 6 mm and 9 mm. At least one optical component may include at least one aspheric surface. At least two optical components may be made of the same material or different materials (e.g., crown material or flint material). At least one region configured to be reflective can be configured as a converging Mangin mirror.

An objective according to the disclosure includes an above-described optical arrangement according to the disclosure. The objective has the features and advantages already specified above in conjunction with the optical arrangement according to the disclosure. The objective can be configured as a photographic objective for imaging distant objects or as a microscope objective.

The image capture apparatus according to an aspect of the disclosure, for example a camera or a microscope, and the image reproduction apparatus according to an aspect of the disclosure, for example a projector, include an objective according to an aspect of the disclosure.

The device according to an aspect of the disclosure, which may be a microscope or mobile device, includes an image capture apparatus according to an aspect of the disclosure or an image reproduction apparatus according to an aspect of the disclosure or an optical arrangement according to an aspect of the disclosure. The mobile device according to an aspect of the disclosure can be a cellular telephone, tablet, notebook, smartwatch, netbook, etc. The mobile device has the above-described advantages of the optical arrangement according to an aspect of the disclosure.

BRIEF DESCRIPTION OF THE DRAWINGS

The disclosure will now be described with reference to the drawings wherein.

DESCRIPTION OF EXEMPLARY EMBODIMENTS

The disclosure is explained in greater detail below on the basis of exemplary embodiments and with reference to the accompanying figures. Although the disclosure is more specifically illustrated and described in detail with the exemplary embodiments, nevertheless the disclosure is not restricted by the examples disclosed and other variations can be derived therefrom by a person skilled in the art, without departing from the scope of protection of the disclosure.

The figures are not necessarily accurate in every detail and to scale, and can be presented in enlarged or reduced form for the purpose of better clarity. For this reason, functional details disclosed here should not be understood to be limiting, but merely to be an illustrative basis that gives guidance to a person skilled in this technical field for using the present disclosure in various ways.

The expression "and/or" used here, when it is used in a series of two or more elements, means that any of the elements listed can be used alone, or any combination of two or more of the elements listed can be used. For example, if a structure is described as containing the components A, B and/or C, the structure can contain A alone; B alone; C alone; A and B in combination; A and C in combination; B and C in combination; or A, B, and C in combination.

Figure 1:
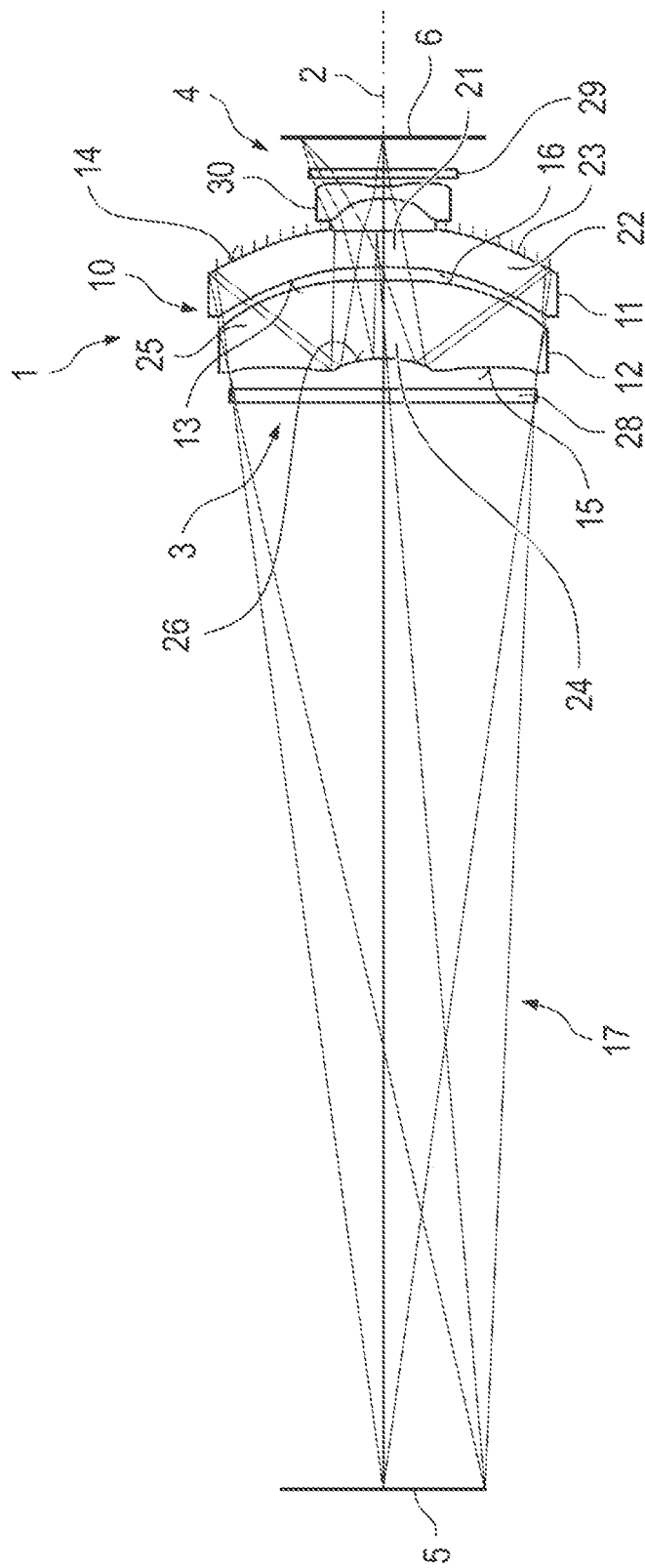
FIG. 1 schematically shows an optical arrangement according to a first exemplary embodiment of the disclosure, in a setting for producing a microscopic image representation.
Figure 2:
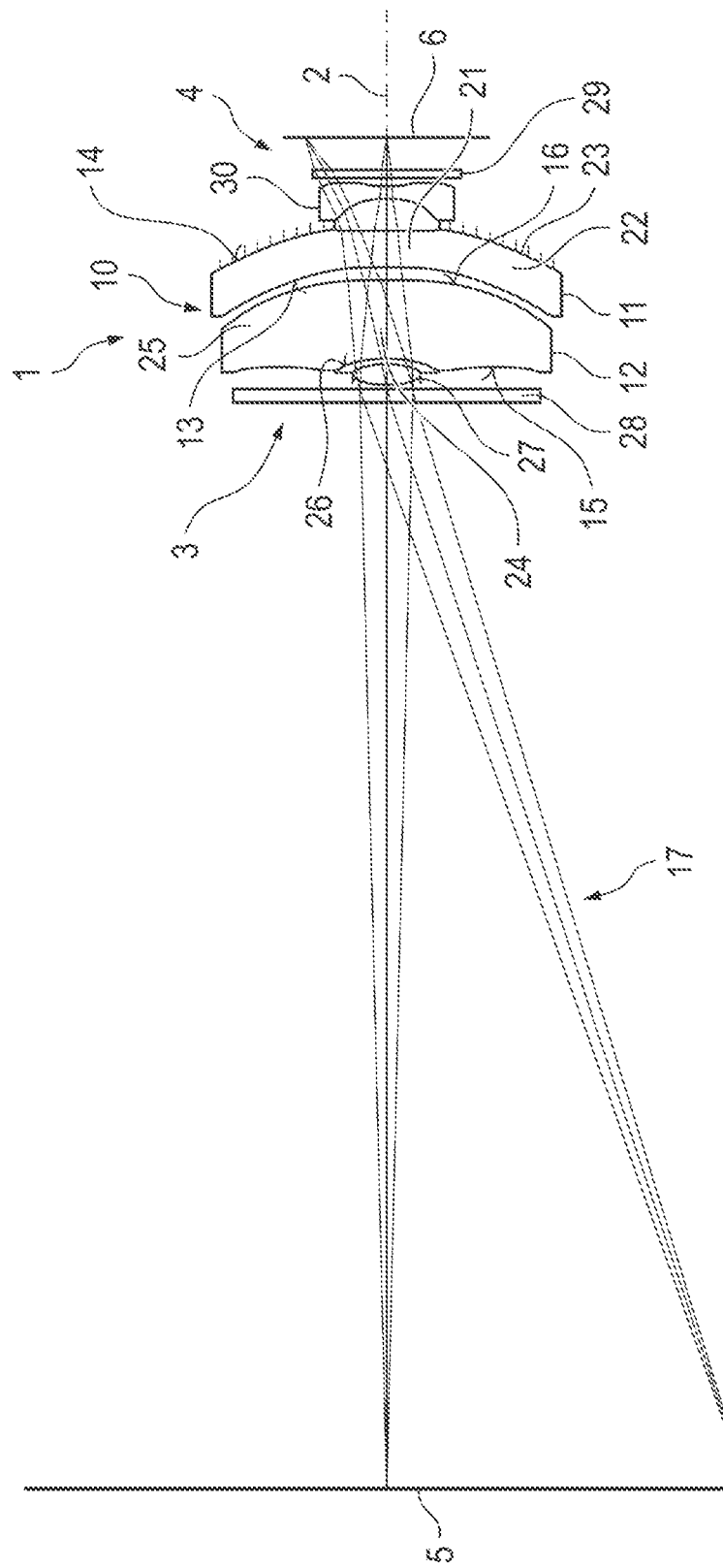
FIG. 2 schematically shows the optical arrangement shown in FIG. 1, in a setting for producing an overview image representation.
Figure 3:
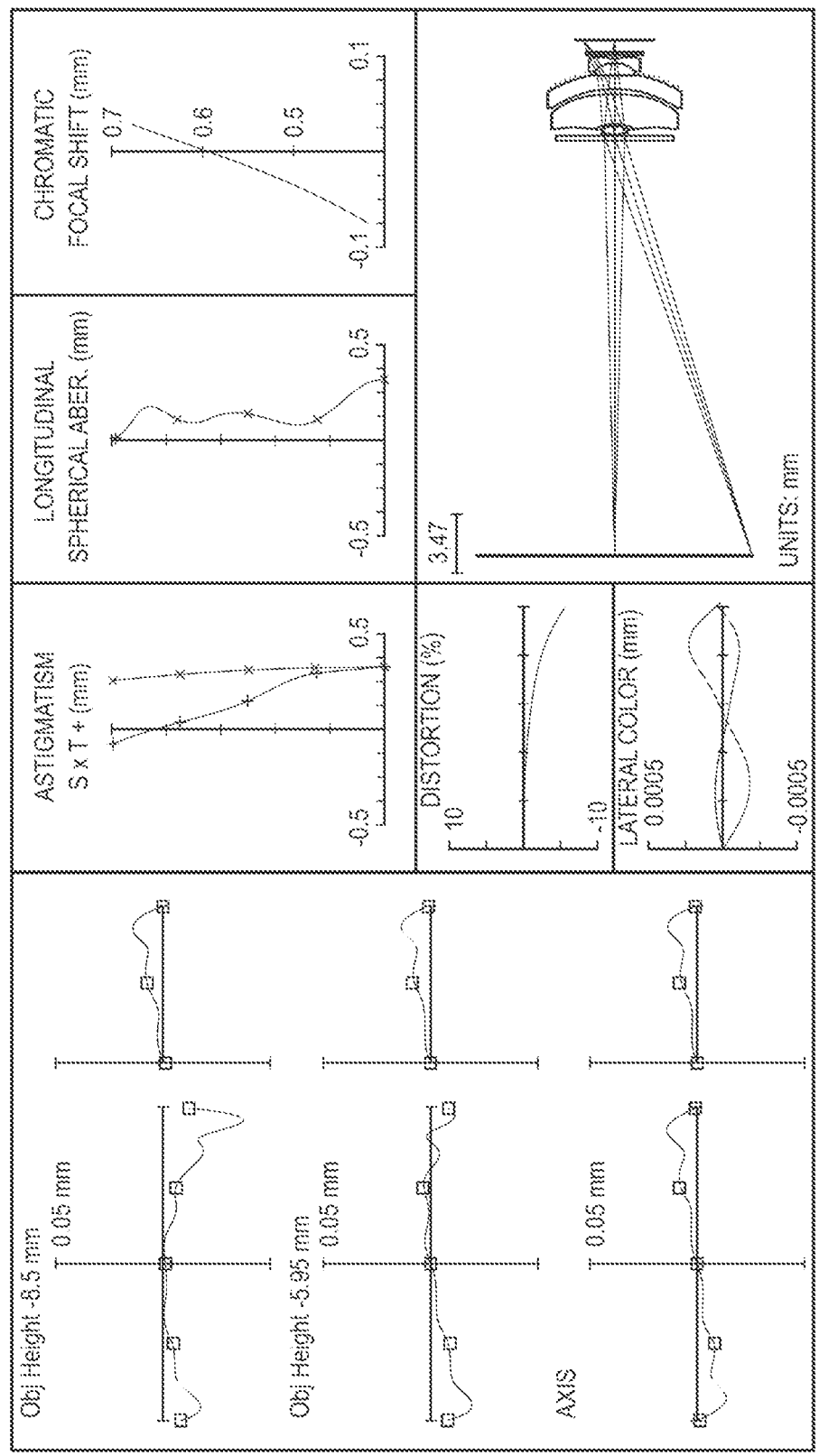
FIG. 3 schematically shows the image aberrations, in the form of diagrams, arising within the scope of the overview image representation.

A first exemplary embodiment variant of the present disclosure is explained in more detail hereinafter on the basis of FIGS. 1 to 3. In this context, FIG. 1 shows an optical arrangement according to the disclosure, in a setting for producing a microscopic image representation. FIG. 2 shows the optical arrangement shown in FIG. 1, in a setting for producing an overview image representation. FIG. 3 illustrates the image aberrations, in the form of diagrams, arising within the scope of the overview image representation.

The optical arrangement 1 shown in FIGS. 1 and 2 includes a center axis 2, which coincides with the optical axis in the example shown, an object side 3, and an image side 4. In this case, the object side 3 faces an object to be imaged or an object plane 5 and the image side 4 faces an image plane 6 or a detector, for example a camera, arranged in the region of the image plane. Moreover, the optical arrangement 1 includes a catadioptric arrangement 10.

The catadioptric arrangement 10 includes a first, partly reflective optical component 11 and a second, partly reflective optical component 12. These are configured as lenses in the example shown. The first, partly reflective optical component 11 includes a front side 13 and a back side 14. The second, partly reflective optical component 12 likewise includes a front side 15 and a back side 16. In this case, the front sides 13 and 15 face the object side 3, and the back sides 14 and 16 face the image side 4. The first optical component 11 and the second optical component 12 are arranged in succession in the beam path 17 along the center axis 2 so that the first optical component 11 is arranged on the image side of the second optical component 12.

In relation to the center axis 2, the first optical component 11 includes a radially inner region 21 and a radially outer region 22. In this case, the inner region 21 is configured to be at least partly transparent to, or at least partly transmit, light incident from the object side. The outer region 22 is configured to reflect light incident from the object side. To this end, the back side 14 of the first optical component 11 has a reflective coating 23. The latter is configured to be concave on the object side in the example shown.

In relation to the center axis 2, the second optical component 12 includes a radially inner region 24 and a radially outer region 25. In this case, the outer region 25 is configured to be transparent to, or transmit, light incident from the object side. The inner region 24 is configured to be at least partly transparent to, or at least partly transmit, light incident from the object side and is configured to reflect light incident from the image side. To this end, the front side 15 of the second optical component 12 has a reflective coating 26. The latter is configured to be convex on the image side in the example shown.

At least one further optical component 27 is arranged at the inner region 24 of the second optical component 12. It is not shown in FIG. 1 as it has no optical function in the context of producing the microscopic image representation; instead, it is only relevant in the context of the production of an overview image representation, which is depicted in FIG. 2. The at least one further component 27 is typically securely connected, for example cemented, to the front side 15 of the second optical component on the inner region 24. The further optical component 27 has positive refractive power. The latter can be in the range of L/4<f1<L/1.5, where L is the vertex distance of an object-side face of the further optical component from an image plane and f1 is the focal length of the further optical component. In particular, r1=L/3 and f1=L/2.5, for instance, may apply in the exemplary embodiments. In the exemplary embodiment shown in FIG. 2, the further optical component 27 includes two lenses that are cemented to one another.

Optionally, the optical arrangement 1 according to an exemplary embodiment of the disclosure, shown in FIGS. 1 and 2, includes an optically transparent cover 28, for example in the form of a cover glass, arranged on the object side and an optically transparent cover 29, for example in the form of a cover glass, arranged on the image side, and also at least one field lens 30 arranged on the image side of the first optical component 11, for example between the first optical component 11 and the image plane 6 or between the first optical component 11 and the cover 29. The at least one field lens 30 typically has negative refractive power. For example, let L be the vertex distance of the object-side surface of the further optical component from the image plane and let $f_F$ be the refractive power of the field lens, then $L/f_F < -1$ typically applies.

In the setting shown in FIG. 1, the optical arrangement 1 shown images an object half diagonal with a length of between 2 mm and 3 mm, specifically 2.4 mm. The light 17 coming from the object 5 enters the optical arrangement 1 through the partly reflective front side 15, it initially passes through the second optical component 12, and, at the backside 14 of the first optical component 11 and in the outer region 22 thereof, it is reflected at the mirror 23, which is concave in the direction of light propagation. Subsequently, the light passes back through the first optical component 11 and the second optical component 12 and it is reflected anew in the inner region 24 of the second optical component at the mirror 26, which is convex in the direction of light propagation, before it once again passes through the first optical component 11 and leaves the latter in its inner region 21 and, after passing through the at least one field lens 30 with negative refractive power, it reaches the image plane 6 or is imaged onto an image detector.

The chief ray angle in front of the object 5 is more or less 6 degrees, for example, and it is approximately 4 degrees following the entry into the second optical component 12. Therefore, an optical unit whose object-side chief ray angle in air has a value greater than 6 degrees, for example 20 degrees or more, must be provided for the purpose of imaging a larger object field in order to produce an overview image representation. This is tantamount to the statement that the chief ray angle of such imaging should have a value of approximately 10-15 degrees within the lens material. The obscuration of the imaging described is approximately 35-40 percent. This means the following: If the marginal ray of the imaging is considered, which is to say the beam traveling from the center of the object 5 to the edge of the pupil, this said marginal ray has a height in a direction perpendicular to the optical axis or center axis 2 which is approximately three times greater upon entry into the optical arrangement 1 than during the second reflection, which is geometrically located at approximately the same axial position. According to the Lagrange invariant, the chief ray angle at the second reflection must therefore include an angle with the optical axis that is approximately three times larger at the second reflection than at the location of the system pupil.

If the imaging is now considered against the direction of light propagation, which is to say from the image plane 6 or a detector to the object 5, then the chief ray leaves the image plane 6 convergently to the optical axis of the center axis 2, passes through the field lens 30 and the first, partly reflective optical component 11, and is incident on the reflective 26 inner region 24 of the second optical component 12. According to the argument presented above, the geometric ray angle at this position is approximately 10.5 degrees, in line with expectations. If, according to the disclosure, the inner part of the second optical component 12 now is not completely reflective, then the chief ray leaves the inner region 24 of the second optical component 12 at an angle of approximately 15 degrees. The marginal ray of the backward imaging from the image plane 6 to the object 5 diverges at this point. As a result of the pronounced positive refractive power of the further optical component 27, the latter can be used to focus the marginal ray onto the object 5. The refractive power of the further optical component 27 has only a small effect on the chief ray, which is to say the field angle remains essentially at 15 degrees, and would therefore lead to the imaging of significantly enlarged surroundings of the overly microscopic small object field. This is shown in FIG. 2.

In addition to appropriate focusing on the object plane 5, the use of two different materials in the lens doublet of the further optical component 27 used in the example shown also allows correction of the longitudinal chromatic aberration of the image representation. FIG. 3 illustrates the aberrations of the overview image representation along the actual direction of light propagation from the object 5 on to the image plane 6 as geometric transverse aberrations. In particular, a significant field curvature and astigmatism, coma and distortion appear as dominant aberrations. The effect of coma can be improved by subsequent, further stopping down of the overview channel, to the detriment of the image brightness. Like the coma, the distortion is a result of the stop position and is therefore unable to be corrected, especially not by stopping down either. However, in comparison with the purely paraxial value, the sign of the distortion (negative or pincushion distortion) helps with a further magnification of the imaged object in the overview channel or in the overview image representation for a given size of the detector or the imaging area 6. Optionally, the curved-line effects which arise due to distortion can likewise be post-corrected with image processing.

For the microscopic application, the stop of the system is in the vicinity of the concave mirror 23, which is to say either on the front side 13 or the back side 14 of the first optical component 11, in each case during the first passage through air. This stop position ensures that it is possible to realize the system with a small obscuration (less than 40 percent). The precise value of the obscuration also depends on the ratio of the chosen numerical aperture and the field dimension.

Specifically, the diagrams depicted to the left in FIG. 3 show transverse aberrations arising for an object height of −8.5 mm (in the first line) and for an object height of −5.95 mm (in the second line), in each case for wavelengths of 588 nm, 486 nm and 656 nm, and the corresponding longitudinal aberrations are shown in the third line. The astigmatism arising is imaged in the diagram shown top center in FIG. 3, the longitudinal spherical aberration in millimeters is shown in the diagram to the right thereof, and the chromatic focal shift in millimeters is shown at the top, far right. The drawing to the bottom right of FIG. 3 corresponds to the drawing of FIG. 2. The two diagrams to the left thereof show the distortion in percent (top) and the lateral chromatic aberration in millimeters (bottom).

For a second embodiment variant, FIG. 2 shows an optical arrangement according to an exemplary embodiment of the disclosure, in a setting for producing an overview image representation. In contrast to the configuration chosen in the first exemplary embodiment variant, a simple lens has been used, in place of a doublet, as a further optical component 27. This leads to a system in which the chromatic aberrations are not fully corrected. Nevertheless, monochromatic aberrations such as coma, field curvature, and distortion also dominate in this case, and so this variant is advantageous on account of its simpler and hence more cost-effective structure in comparison with the preceding exemplary embodiment variant.

Figure 5:
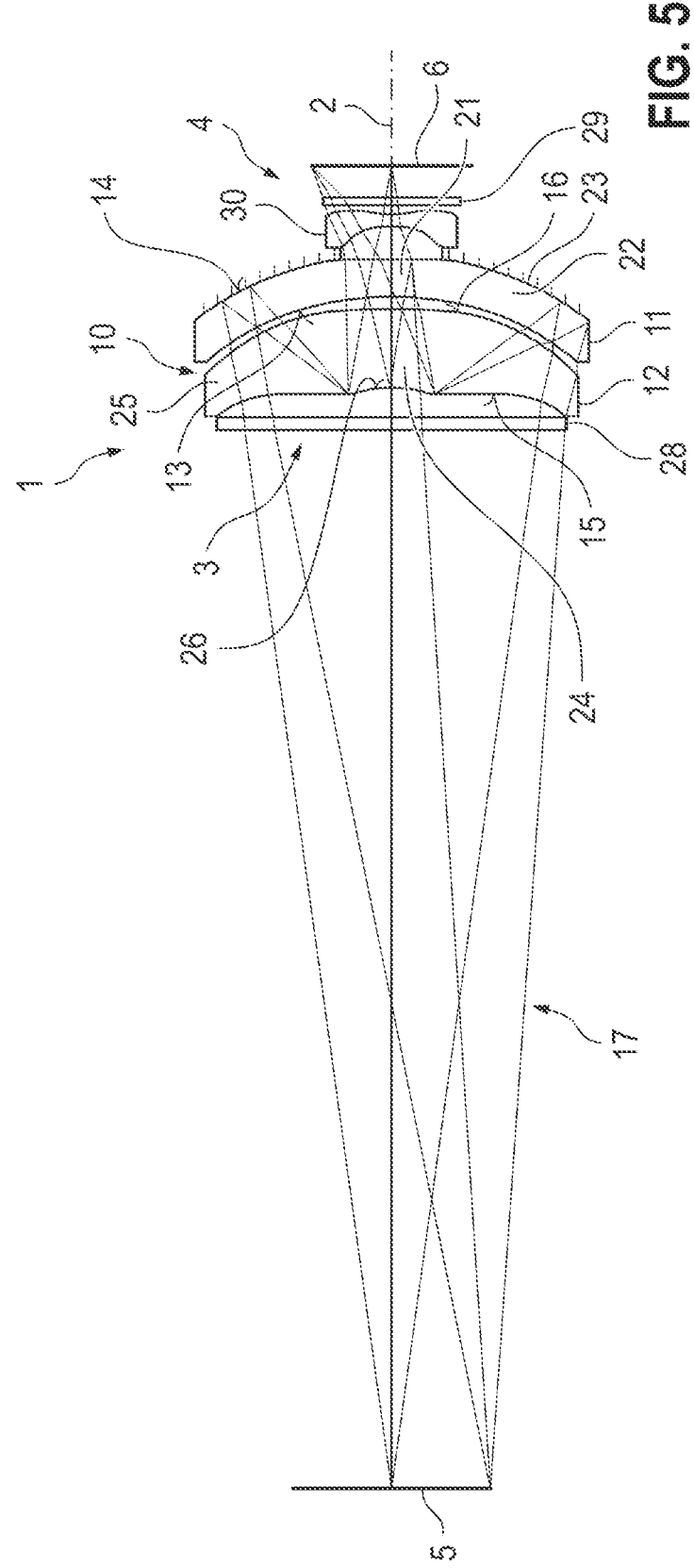
FIG. 5 schematically shows an optical arrangement according to a third exemplary embodiment of the disclosure, in a setting for producing a microscopic image representation.
Figure 6:
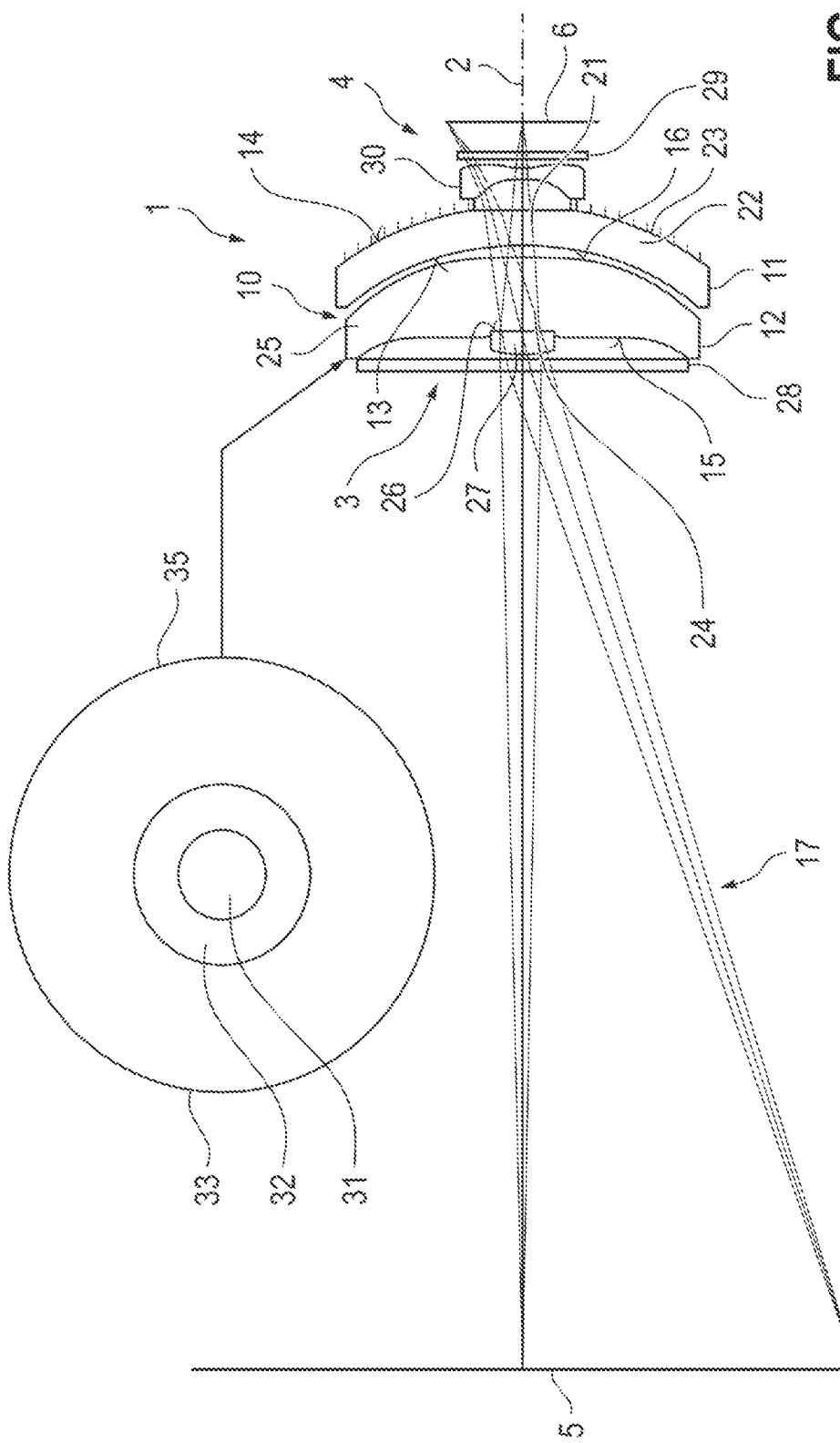
FIG. 6 schematically shows the optical arrangement shown in FIG. 5, in a setting for producing an overview image representation.

A third exemplary embodiment variant is explained hereinafter on the basis of FIGS. 5 and 6. In this case, a doublet was used within the scope of the further optical component 27 for the purpose of forming the overview region, which is to say in order to produce an overview image representation, like in the first exemplary embodiment variant; however, as an alternative thereto, the use of a single lens, like in the embodiment variant described above, is also possible. The peculiarity of the third exemplary embodiment variant has the system stop being arranged on a plane perpendicular to the center axis or optical axis, axially level with the reflective coating 26 of the second, partly reflective optical component 12. This area acts as a system stop for both the microscopic image representation and the overview image representation. As a consequence thereof, the obscuration is approximately 50 percent. The advantage of this variant consists in the fact that the so-called footprints of all field points in this plane are congruently overlaid. Consequently, the obscuration in this plane manifests itself quite visibly, which is to say the reflective inner region 26 of the second optical component 12 does not see any light from the microscopic image representation. In turn, this is advantageous for the signal separation presented hereinafter for all exemplary embodiment variants described.

The functionality according to the disclosure of the option for producing an overview image representation with an overview channel is very advantageous in the case of an application as a microscope objective in particular, but can also be applied to photographic objectives. Especially in the case of smartphone photography or, in general, in the context of mobile devices, the described catadioptric obscured concept is advantageously applicable in order to be able to realize very long focal length objectives in a small installation space. Consequently, the user is able to quickly switch between an overview channel with a large field angle, which is to say a small focal length, and the actual photographic channel for producing a microscopic image representation.

Within the scope of the present disclosure, the same detector can be used both for the microscopic observation and for the overview observation. Therefore, it is necessary to establish a separation between the two channels, which is to say the production of a microscopic image representation and the production of an overview image representation, which is to say it must be possible to clearly define whether the detector sees the light from the microscopy channel or the light from the overview channel. Essentially there are four options to this end. All relate to the design of the front side 15 of the second, partly reflective optical component 12, in particular to the inner, reflective region 24.

The first option for signal separation consists in the layer 26 of the reflective inner region 24 of the second, partly reflective optical component being configured as a beam splitter layer, in the case of which a defined percentage of the incident light is reflected and the remainder of the light is transmitted. For example, the corresponding layer or the corresponding component part can be designed so that approximately 50 percent of the incident light is reflected and 50 percent is transmitted. However, a different ratio is also possible, for example 60 percent and 40 percent or 70 percent and 30 percent or 30 percent and 70 percent or 40 percent and 60 percent. However, any other ratio in the range between 30 and 70 percent on the respective one side and, accordingly, between 70 and 30 percent on the other side can be selected. In all variants, both the light from the microscopic channel and the light from the overview channel simultaneously reach the detector, and are superposed on one another.

If a switchable layer which can switch between transmissive and opaque faces by the application of a switching voltage is now applied to the entrance window of the optical arrangement, which is to say in the beam path upstream of the second optical component 12, for example on the latter or within the scope of the plane-parallel plate 28, it is possible to alternately superimpose or mask the one signal or the other. Such an optical component part can be integrated into the second optical component 12 or integrated into the plane-parallel plate 28, or it can be designed as a separate component. The switchable layer can be in the form of an LCD array, for example.

Figure 7:
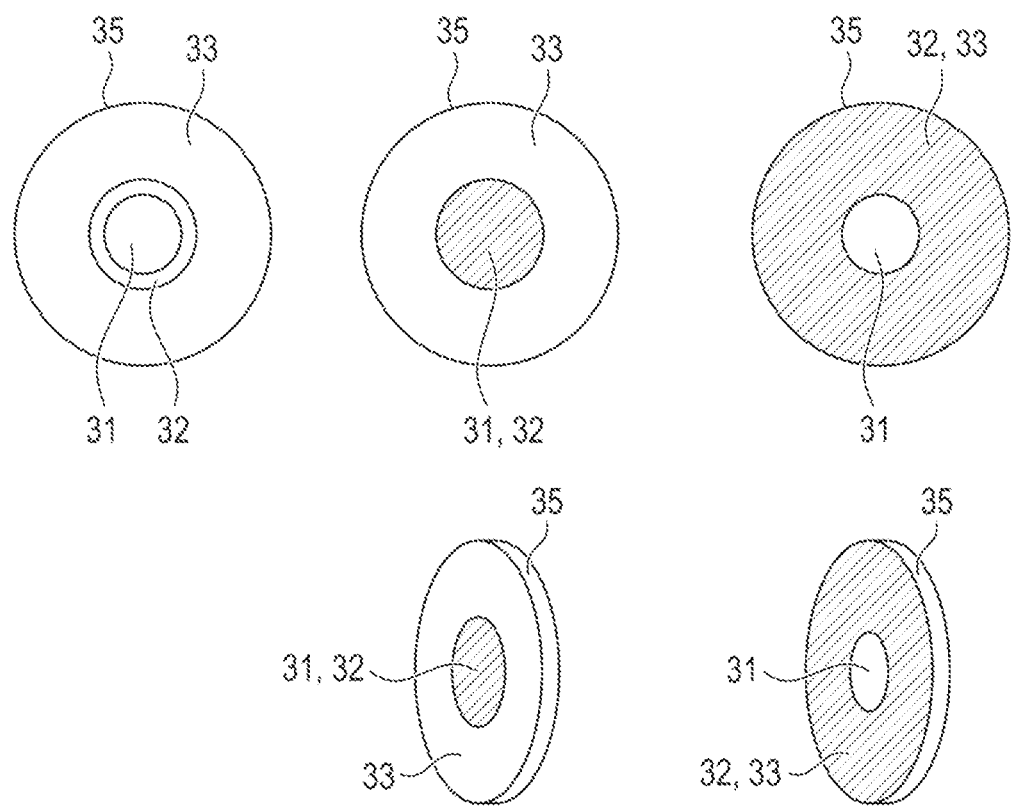
FIG. 7 schematically shows an optical component part for signal separation.

Typically, the front side 15 of the second, partly reflective optical component 12 has a layer arrangement with three concentric regions. This geometry is illustrated schematically in FIGS. 6 and FIG. 7. FIGS. 6 and 7 schematically show an optical component part 35 for signal separation. With respect to the center axis 2, the optical component part 35 used includes a radially inner region 31 and a radially outer region 33. A radial intermediate region 32, which may also be in the form of a partial region of the radially inner region 31, is arranged between the radially inner region of and the radially outer region 33. The aforementioned regions can be configured to be circular or ring-shaped. Both the outer region 33 and the inner region 31 include an above-described switchable layer which enables a signal separation. The intermediate region 32 may optionally likewise have a switchable configuration.

If the radially outer region 33 is set to be transparent and the inner region 31 is set to be non-transparent, as shown in FIG. 7, center, then the microscopic signal can enter the optical arrangement 1 while the overview signal is blocked. If the outer region 33 is set to be non-transparent and the inner region 31 is set to be transparent, as shown in FIG. 7, right, then the overview signal can enter the optical arrangement 1 while the microscopic signal is blocked. The intermediate region 32 is typically set to be permanently non-transparent, for example stained in black. This ensures precise separation of the two signals and reflects the fact that the switchable layer or the corresponding optical component part 35 cannot be situated exactly in the respective entrance pupil planes of overview signal and microscopic channel.

A second option for signal separation can be realized by virtue of the inner region 24 of the second optical component 12 being configured with a wavelength-selective dielectric layer. For example, the layer may have a high reflectance in the visible wavelength range, which is to say in the range between 400 nm and 800 nm, but exhibit a very high transmission in the near infrared wavelength range, which is to say at approximately 1000 nm. Then, both the microscopic signal and the overview signal may reach the detector. There, the overview signal and the microscopic signal can be separated in two different ways. Either use is made of the detector which also includes pixels sensitive in the near infrared wavelength range in addition to the visually observable standard colors (green-red-blue), or an interchangeable color filter is arranged in front of the detector, the said color filter either blocking the light from the near infrared wavelength range (microscopic image representation) or transmitting the latter (overview image representation). In the case mentioned first, the microscopic signal and the overview signal can be received and presented simultaneously.

A third option for signal separation consists in the application of a polarization-selective layer to the reflective region 26 of the second optical component 12, or in the arrangement of a corresponding component part in this region. The polarization-selective layer or a corresponding optical component part 35 is designed so that it reflects a first polarization state and transmits a different polarization state. In this case, all mutually orthogonal polarization states are possible as polarization states, which is to say, for instance, mutually perpendicular linear polarization or right-handed and left-handed circular polarization. The polarization states can be set again using a suitable polarizing mask at the entrance window, for example in the region of the plane-parallel plate 28 or at the front side 15 of the second optical component 12, the characteristic of the said mask being analogous to the optical component part 35 shown in FIGS. 6 and 7, to the extent that the outer partial region 33 establishes a first polarization of the entering light and the radially inner region 31 establishes a second polarization of the entering light. A distinction can be then made between the two signals by way of a suitable analyzer, in particular by an appropriate change of an analyzer upstream of the image plane 6 or upstream of a detector arranged there.

A fourth variant of signal separation includes the use of a suitable system stop. The optical signals of the two imaging channels jointly use the reflective inner region 24, 26 of the front side 15 of the second optical component and the image plane 6. Therefore, the signal separation can be implemented at the inner region 24, in particular at the reflective region 26 of the front side 15 of the second optical component 12. The microscopic signal is reflected here, while the overview signal is transmitted. If the system stop for the microscopic channel is on this surface, then the beams of all field points that are imaged exactly coincide.

On account of the obscured imaging, the reflective coating 26 can be configured as a ring-shaped layer with a strictly defined outer edge and a strictly defined inner edge since the inner region of the beams does not contain any light in any case on account of the obscuration. The front side 15 of the second optical component thus contains a layer divided into three ring zones in this variant (in a manner analogous to the variant shown in FIG. 7). In this case, the outer region 33 is non-reflective in order to allow the microscopic signal to enter into the optical arrangement 1, the central region 32 is reflective in order to reflect the microscopic signal again following the reflection at the first optical component 11, and the inner region 31 is ultimately non-reflective again in order to introduce the overview signal into the optical arrangement 1 in the pupil obscuration of the microscopic signal. The advantage of this variant consists in the fact that a very high transmission is realizable for both the microscopic channel and the overview channel since the signals are geometrically separated.

The described variants of signal separation can naturally also be combined with one another.

Figure 8:
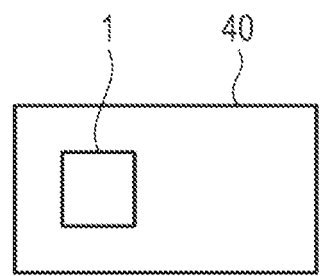
FIG. 8 schematically shows a device according to an exemplary embodiment of the disclosure.

FIG. 8 schematically shows a device 40 according to the disclosure. The device 40 can be a microscope or a mobile device. The device 40 includes an above-described optical arrangement 1 according to the disclosure. It has the features and advantages already mentioned in this context. In particular, the optical arrangement 1 can be configured as an objective and/or can contain an image capture apparatus, for example a camera.

The construction data for the arrangements shown in the figures are shown hereinafter in tabular form.

TABLE 1

| FIG. | Numerical aperture | Object height [mm] | Effective focal length [mm] |
|---|---|---|---|
| 1 | 0.17 | 2.4 | 2.63 |
| 2 | 0.09 | 8.5 | 4.049 |

TABLE 1-continued

| FIG. | Numerical aperture | Object height [mm] | Effective focal length [mm] |
|---|---|---|---|
| 4 | 0.09 | 8.5 | 4.123 |
| 5 | 0.17 | 2.4 | 2.737 |
| 6 | 0.08 | 8.5 | 4.042 |

Figure 4:
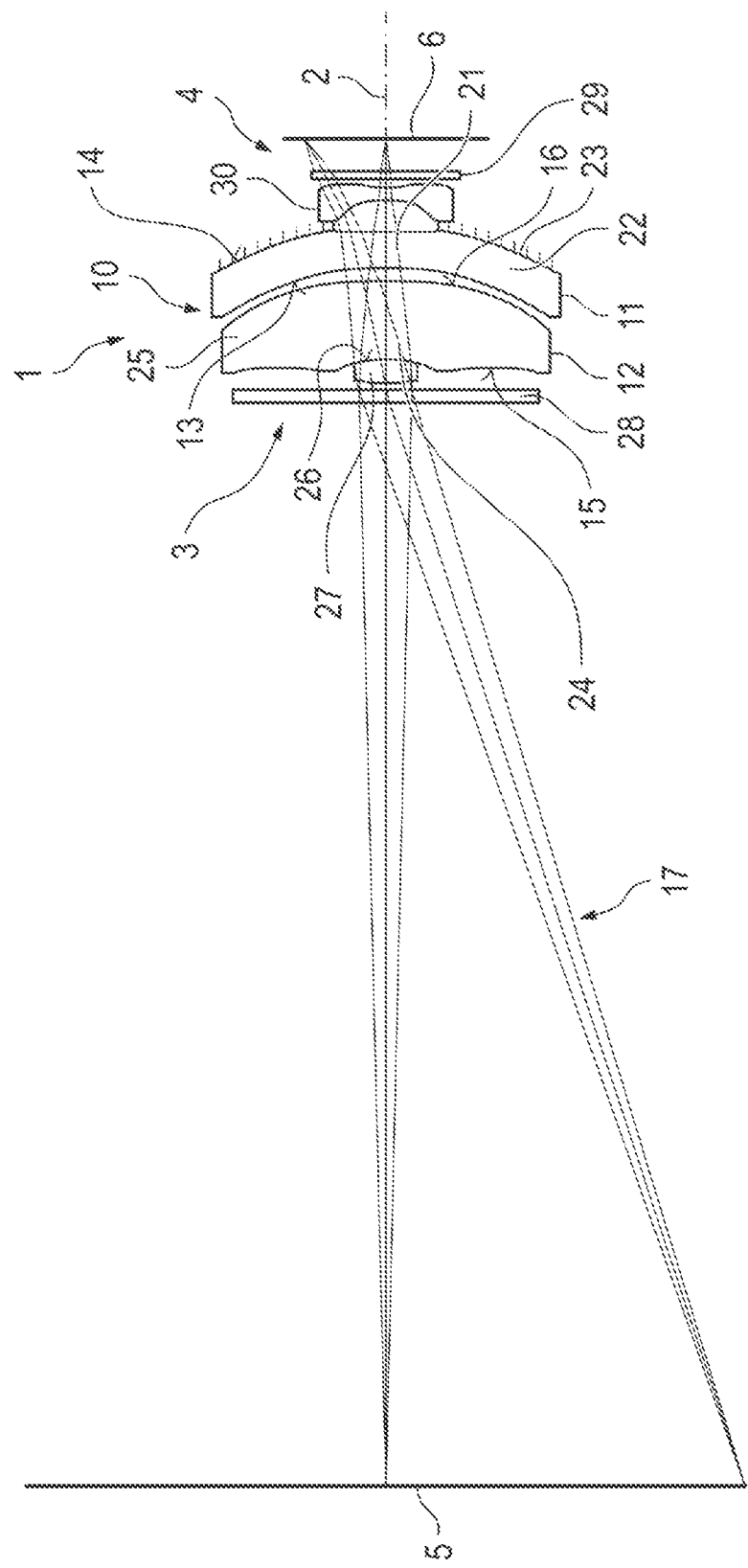
FIG. 4 schematically shows an optical arrangement according to a second exemplary embodiment of the disclosure, in a setting for producing an overview image representation.

Tables 2 to 5 below specify the construction data of the arrangement shown in FIG. 1, tables 6 to 9 specify the construction data of the arrangement shown in FIG. 2, tables 10 to 13 specify the construction data of the arrangement shown in FIG. 4, tables 14 to 17 specify the construction data of the arrangement shown in FIG. 5, and tables 18 to 21 specify the construction data of the arrangement shown in FIG. 6.

The faces denote the individual surfaces of the lenses and optical elements along the beam path. The face 0 corresponds to the object plane, the face 1 corresponds to the object-side outer surface of the cover 28 and the face with the highest ordinal number corresponds to the image plane. INDEX1 denotes the refractive index for a wavelength of 587.56 nm, INDEX2 denotes the refractive index for a wavelength of 486.13 nm, INDEX3 denotes the refractive index for a wavelength of 656.27 mm and SEMIDIAM. denotes half the optically free diameter of the optical face in mm. The material designations used are as follows: PCARB—polycarbonate, N-BK7—glass type from SCHOTT AG, PMMA—polymethylmethacrylate, REFL—reflective face.

For the aspherically configured faces, the coefficients K and C1 to C6 are specified in accordance with the expansion $$p(h) = \frac{\varrho h^2}{1 + \sqrt{1 - (1+K)(\varrho h)^2}} + C_1 h^4 + C_2 h^6 + C_3 h^8 + \cdots + C_n h^{2n+2}$$

Here, p(h) denotes what is known as the sagittal height of the face at the height h. The sagittal height is understood to mean the perpendicular distance of the face from the tangential plane at the face vertex. Moreover, $$\varrho = \frac{1}{r}$$

denotes the vertex curvature as the reciprocal of the vertex radius specified in the tables and, lastly, K reproduces the conic constant.

TABLE 2

| Face | Vertex radius of the face curvature [mm] | Distance to the next face (air gap or lens thickness) [mm] | Material |
|---|---|---|---|
| 0 | 0 | 25.000000 | |
| 1 | 0 | 0.300000 | N-BK7 |
| 2 | 0 | 0.421413 | |
| 3 | 20.470689 | 2.118059 | PMMA |
| 4 | −10.459102 | 0.298291 | |
| 5 | −6.633285 | 1.005571 | PCARB |
| 6 | −7.242031 | −1.005571 | REFL |
| 7 | −6.633285 | −0.298291 | |
| 8 | −10.459102 | −1.787716 | PMMA |
| 9 | −2.552555 | 1.787716 | REFL |
| 10 | −10.459102 | 0.298291 | |

TABLE 2-continued

| Face | Vertex radius of the face curvature [mm] | Distance to the next face (air gap or lens thickness) [mm] | Material |
|---|---|---|---|
| 11 | −6.633285 | 0.914722 | PCARB |
| 12 | −4.884776 | 0.737114 | |
| 13 | −8.075678 | 0.295630 | PMMA |
| 14 | 1.087657 | 0.206988 | |
| 15 | 0 | 0.210000 | N-BK7 |
| 16 | 0 | 0.700000 | |
| 17 | 0 | 0.000000 | |

TABLE 3

| Face | INDEX1 | INDEX2 | INDEX3 | SEMIDIAM. |
|---|---|---|---|---|
| 0 | | | | |
| 1 | 1.516800 | 1.522376 | 1.514322 | 3.593 |
| 2 | | | | 3.602 |
| 3 | 1.491778 | 1.497655 | 1.489178 | 3.621 |
| 4 | | | | 3.871 |
| 5 | 1.585474 | 1.599450 | 1.579864 | 3.866 |
| 6 | 1.585474 | 1.599450 | 1.579864 | 4.096 |
| 7 | | | | 3.866 |
| 8 | 1.491778 | 1.497655 | 1.489178 | 3.871 |
| 9 | 1.491778 | 1.497655 | 1.489178 | 1.224 |
| 10 | | | | 3.871 |
| 11 | 1.585474 | 1.599450 | 1.579864 | 3.866 |
| 12 | | | | 1.16 |
| 13 | 1.491778 | 1.497655 | 1.489178 | 1.214 |
| 14 | | | | 1.214 |
| 15 | 1.516800 | 1.522376 | 1.514322 | 1.668 |
| 16 | | | | 1.709 |
| 17 | | | | 1.939 |

TABLE 4

| Face | K | C1 | C2 | C3 |
|---|---|---|---|---|
| 3 | 0 | −6.571637E−04 | −1.816106E−04 | 8.128466E−06 |
| 4 | 0 | 7.186770E−04 | −3.989893E−04 | 1.557134E−05 |
| 5 | 0 | 5.262865E−04 | 6.227060E−05 | −1.592519E−05 |
| 6 | 0 | −3.010898E−05 | 4.368828E−05 | −2.196873E−06 |
| 7 | 0 | 5.262865E−04 | 6.227060E−05 | −1.592519E−05 |
| 8 | 0 | 7.186770E−04 | −3.989893E−04 | 1.557134E−05 |
| 9 | 0 | 5.218363E−03 | 6.068809E−03 | −1.121948E−02 |
| 10 | 0 | 7.186770E−04 | −3.989893E−04 | 1.557134E−05 |
| 11 | 0 | 5.262865E−04 | 6.227060E−05 | −1.592519E−05 |
| 12 | 0 | 5.061231E−02 | −3.321540E−02 | 1.082989E−01 |
| 13 | −10 | −8.567141E−01 | 1.413277E+00 | −1.570578E+00 |
| 14 | −10 | −2.803844E−01 | 3.270699E−01 | −2.453285E−01 |

TABLE 5

| Face | C4 | C5 | C6 |
|---|---|---|---|
| 3 | 4.441712E−08 | −2.643070E−08 | 6.512805E−10 |
| 4 | 3.426735E−07 | −2.984316E−08 | 2.743198E−10 |
| 5 | 8.357455E−07 | 2.976640E−09 | −8.178471E−10 |
| 6 | 9.694773E−09 | 2.464996E−09 | −6.579685E−11 |
| 7 | 8.357455E−07 | 2.976640E−09 | −8.178471E−10 |
| 8 | 3.426735E−07 | −2.984316E−08 | 2.743198E−10 |
| 9 | 1.116379E−02 | −4.985405E−03 | 8.421154E−04 |
| 10 | 3.426735E−07 | −2.984316E−08 | 2.743198E−10 |
| 11 | 8.357455E−07 | 2.976640E−09 | −8.178471E−10 |
| 12 | −1.185504E−01 | 6.322865E−02 | −1.116034E−02 |
| 13 | 1.097594E+00 | −4.345918E−01 | 7.366391E−02 |
| 14 | 1.060212E−01 | −2.487455E−02 | 2.380131E−03 |

TABLE 6

| Face | Vertex radius of the face curvature [mm] | Distance to the next face (air gap or lens thickness) [mm] | Material |
|---|---|---|---|
| 0 | 0 | 25.000000 | |
| 1 | 0 | 0.300000 | N-BK7 |
| 2 | 0 | 0.101756 | |
| 3 | 1.728157 | 0.500000 | PMMA |
| 4 | −1.557319 | 0.150000 | PCARB |
| 5 | −2.552555 | 1.787716 | PMMA |
| 6 | −10.459102 | 0.298291 | |
| 7 | −6.633285 | 0.914722 | PCARB |
| 8 | −4.884776 | 0.737114 | |
| 9 | −8.075678 | 0.295630 | PMMA |
| 10 | 1.087657 | 0.206988 | |
| 11 | 0 | 0.210000 | N-BK7 |
| 12 | 0 | 0.700000 | |
| 13 | 0 | 0.000000 | |

TABLE 7

| Face | INDEX1 | INDEX2 | INDEX3 | SEMIDIAM. |
|---|---|---|---|---|
| 0 | | | | |
| 1 | 1.516800 | 1.522376 | 1.514322 | 3.593 |
| 2 | | | | 3.602 |
| 3 | 1.491778 | 1.497655 | 1.489178 | 0.8 |
| 4 | 1.585474 | 1.599450 | 1.579864 | 0.8 |
| 5 | 1.491778 | 1.497655 | 1.489178 | 1.224 |
| 6 | | | | 3.871 |
| 7 | 1.585474 | 1.599450 | 1.579864 | 3.866 |
| 8 | | | | 1.16 |
| 9 | 1.491778 | 1.497655 | 1.489178 | 1.214 |
| 10 | | | | 1.585 |
| 11 | 1.516800 | 1.522376 | 1.514322 | 1.668 |
| 12 | | | | 1.709 |
| 13 | | | | 1.939 |

TABLE 8

| Face | K | C1 | C2 | C3 |
|---|---|---|---|---|
| 3 | 0 | 1.862320E−01 | −2.761180E+00 | 1.911820E+01 |
| 5 | 0 | 5.218363E−03 | 6.068809E−03 | −1.121948E−02 |
| 6 | 0 | 7.186770E−04 | −3.989893E−04 | 1.557134E−05 |
| 7 | 0 | 5.262865E−04 | 6.227060E−05 | −1.592519E−05 |
| 8 | 0 | 5.061231E−02 | −3.321540E−02 | 1.082989E−01 |
| 9 | −10 | −8.567141E−01 | 1.413277E+00 | −1.570578E+00 |
| 10 | −10 | −2.803844E−01 | 3.270699E−01 | −2.453285E−01 |

TABLE 9

| Face | C4 | C5 | C6 |
|---|---|---|---|
| 3 | −6.766930E+01 | 1.180325E+02 | −8.027870E+01 |
| 5 | 1.116379E−02 | −4.985405E−03 | 8.421154E−04 |
| 6 | 3.426735E−07 | −2.984316E−08 | 2.743198E−10 |
| 7 | 8.357455E−07 | 2.976640E−09 | −8.178471E−10 |
| 8 | −1.185504E−01 | 6.322865E−02 | −1.116034E−02 |
| 9 | 1.097594E+00 | −4.345918E−01 | 7.366391E−02 |
| 10 | 1.060212E−01 | −2.487455E−02 | 2.380131E−03 |

TABLE 10

| Face | Vertex radius of the face curvature [mm] | Distance to the next face (air gap or lens thickness) [mm] | Material |
|---|---|---|---|
| 0 | 0 | 25.000000 | |
| 1 | 0 | 0.300000 | N-BK7 |
| 2 | 0 | 0.089874 | |

TABLE 10-continued

| Face | Vertex radius of the face curvature [mm] | Distance to the next face (air gap or lens thickness) [mm] | Material |
|---|---|---|---|
| 3 | 1.859721 | 2.438462 | PMMA |
| 4 | −10.486998 | 0.296368 | |
| 5 | −6.683948 | 0.912589 | PCARB |
| 6 | −5.410038 | 0.720714 | |
| 7 | −7.311651 | 0.295141 | PMMA |
| 8 | 1.123129 | 0.199747 | |
| 9 | 0 | 0.210000 | N-BK7 |
| 10 | 0 | 0.700000 | |
| 11 | 0 | 0.000000 | |

TABLE 11

| Face | INDEX1 | INDEX2 | INDEX3 | SEMIDIAM. |
|---|---|---|---|---|
| 0 | | | | |
| 1 | 1.516800 | 1.522376 | 1.514322 | 3.592 |
| 2 | | | | 3.601 |
| 3 | 1.491778 | 1.497655 | 1.489178 | 0.6 |
| 4 | | | | 3.875 |
| 5 | 1.585474 | 1.599450 | 1.579864 | 3.873 |
| 6 | | | | 1.153 |
| 7 | 1.491778 | 1.497655 | 1.489178 | 1.195 |
| 8 | | | | 1.578 |
| 9 | 1.516800 | 1.522376 | 1.514322 | 1.669 |
| 10 | | | | 1.71 |
| 11 | | | | 1.923 |

TABLE 12

| Face | K | C1 | C2 | C3 |
|---|---|---|---|---|
| 3 | 0 | 2.178887E−01 | −3.065041E+00 | 2.008448E+01 |
| 4 | 0 | 7.387008E−04 | −4.194354E−04 | 1.352978E−05 |
| 5 | 0 | 6.190558E−04 | 1.606371E−05 | −1.283690E−05 |
| 6 | 0 | 4.139196E−02 | −1.594083E−02 | 8.308325E−02 |
| 7 | −10 | −7.893448E−01 | 1.104176E+00 | −1.001031E+00 |
| 8 | −10 | −2.761011E−01 | 2.960634E−01 | −2.058117E−01 |

TABLE 13

| Face | C4 | C5 | C6 |
|---|---|---|---|
| 3 | −6.823136E+01 | 1.151756E+02 | −7.624492E+01 |
| 4 | 9.902543E−07 | −7.333797E−08 | 1.206798E−09 |
| 5 | 1.029591E−06 | −2.320430E−08 | −1.313313E−10 |
| 6 | −1.009909E−01 | 5.859250E−02 | −1.106930E−02 |
| 7 | 5.374286E−01 | −1.524574E−01 | 1.607750E−02 |
| 8 | 8.154465E−02 | −1.738304E−02 | 1.462415E−03 |

TABLE 14

| Face | Vertex radius of the face curvature [mm] | Distance to the next face (air gap or lens thickness) [mm] | Material |
|---|---|---|---|
| 0 | 0 | 25.000000 | |
| 1 | 0 | 0.300000 | N-BK7 |
| 2 | 0 | 0.534559 | |
| 3 | 31.297491 | 2.065583 | PMMA |
| 4 | −11.323415 | 0.285067 | |
| 5 | −7.043083 | 1.041804 | PCARB |
| 6 | −7.323159 | −1.041804 | REFL |
| 7 | −7.043083 | −0.285067 | |
| 8 | −11.323415 | −1.840658 | PMMA |
| 9 | −2.670098 | 1.840658 | REFL |
| 10 | −11.323415 | 0.285067 | |
| 11 | −7.043083 | 0.958672 | PCARB |

TABLE 14-continued

| Face | Vertex radius of the face curvature [mm] | Distance to the next face (air gap or lens thickness) [mm] | Material |
|---|---|---|---|
| 12 | −6.92174 | 0.782803 | |
| 13 | −5.180304 | 0.299659 | PMMA |
| 14 | 1.354493 | 0.19103 | |
| 15 | 0 | 0.210000 | N-BK7 |
| 16 | 0 | 0.700000 | |
| 17 | 0 | 0.000000 | |

TABLE 15

| Face | INDEX1 | INDEX2 | INDEX3 | SEMIDIAM. |
|---|---|---|---|---|
| 0 | | | | |
| 1 | 1.51680011 | 1.52237649 | 1.51432243 | 4.193 |
| 2 | | | | 4.207 |
| 3 | 1.4917783 | 1.49765527 | 1.48917809 | 4.208 |
| 4 | | | | 4.476 |
| 5 | 1.58547414 | 1.59945011 | 1.57986437 | 4.474 |
| 6 | 1.58547414 | 1.59945011 | 1.57986437 | 4.748 |
| 7 | | | | 3.832 |
| 8 | 1.4917783 | 1.49765527 | 1.48917809 | 3.574 |
| 9 | 1.4917783 | 1.49765527 | 1.48917809 | 1.043 |
| 10 | | | | 1.084 |
| 11 | 1.58547414 | 1.59945011 | 1.57986437 | 1.079 |
| 12 | | | | 1.126 |
| 13 | 1.4917783 | 1.49765527 | 1.48917809 | 1.174 |
| 14 | | | | 1.537 |
| 15 | 1.51680011 | 1.52237649 | 1.51432243 | 1.627 |
| 16 | | | | 1.678 |
| 17 | | | | 1.976 |

TABLE 16

| Face | K | C1 | C2 | C3 |
|---|---|---|---|---|
| 3 | 0 | −0.001073553 | −0.0001634062 | 0.00000747066 |
| 4 | 0 | −0.0000224987 | −0.000283158 | 0.00001383485 |
| 5 | 0 | 0.0001490405 | 0.00006260849 | −0.00001149088 |
| 6 | 0 | −0.00004932736 | 0.00003145863 | −0.000001709102 |
| 7 | 0 | 0.0001490405 | 0.00006260849 | −0.00001149088 |
| 8 | 0 | −0.0000224987 | −0.000283158 | 0.00001383485 |
| 9 | 0 | 0.003209194 | 0.001700447 | −0.003299476 |
| 10 | 0 | −0.0000224987 | −0.000283158 | 0.00001383485 |
| 11 | 0 | 0.0001490405 | 0.00006260849 | −0.00001149088 |
| 12 | 0 | 0.03997246 | −0.04257866 | 0.1162403 |
| 13 | −10 | −0.5845332 | 0.5997185 | −0.3639181 |
| 14 | −10 | −0.2541873 | 0.2476351 | −0.1603652 |

TABLE 17

| Face | C4 | C5 | C6 |
|---|---|---|---|
| 3 | 0.0000002615031 | -0.00000005129073 | 0.000000001517979 |
| 4 | 0.00000006672114 | -0.00000002718572 | 0.0000000006906618 |
| 5 | 0.0000006427238 | -0.00000001181276 | -0.00000000000967112 |
| 6 | 0.00000003820088 | -0.0000000002348477 | -0.00000000004911985 |
| 7 | 0.0000006427238 | -0.00000001181276 | -0.00000000000967112 |
| 8 | 0.00000006672114 | -0.00000002718572 | 0.0000000006906618 |
| 9 | 0.003429107 | -0.001070669 | 0.00002315036 |
| 10 | 0.00000006672114 | -0.00000002718572 | 0.0000000006906618 |
| 11 | 0.0000006427238 | -0.00000001181276 | -0.00000000000967112 |
| 12 | -0.1287281 | 0.06881615 | -0.01323135 |
| 13 | 0.09883853 | -0.007940074 | 0.0002990768 |
| 14 | 0.06248288 | -0.0141091 | 0.001393133 |

TABLE 18

| Face | Vertex radius of the face curvature [mm] | Distance to the next face (air gap or lens thickness) [mm] | Material |
|---|---|---|---|
| 0 | 0 | 25.000000 | |
| 1 | 0 | 0.300000 | N-BK7 |
| 2 | 0 | 0.109485 | |
| 3 | 1.758091 | 0.500000 | PMMA |
| 4 | -1.851081 | 0.150000 | PCARB |
| 5 | -2.670098 | 1.840658 | PMMA |
| 6 | -11.323415 | 0.285067 | |
| 7 | -7.043083 | 0.958672 | PCARB |
| 8 | -6.92174 | 0.782803 | |
| 9 | -5.180304 | 0.299659 | PMMA |
| 10 | 1.354493 | 0.19103 | |
| 11 | 0 | 0.210000 | N-BK7 |
| 12 | 0 | 0.700000 | |
| 13 | 0 | 0.000000 | |

TABLE 19

| Face | INDEX1 | INDEX2 | INDEX3 | SEMIDIAM. |
|---|---|---|---|---|
| 0 | | | | |
| 1 | 1.51680011 | 1.52237649 | 1.51432243 | 4.193 |
| 2 | | | | 4.207 |
| 3 | 1.4917783 | 1.49765527 | 1.48917809 | 0.8 |
| 4 | 1.58547414 | 1.59945011 | 1.57986437 | 0.8 |
| 5 | 1.4917783 | 1.49765527 | 1.48917809 | 0.5 |
| 6 | | | | 1.084 |
| 7 | 1.58547414 | 1.59945011 | 1.57986437 | 1.079 |
| 8 | | | | 1.126 |
| 9 | 1.4917783 | 1.49765527 | 1.48917809 | 1.174 |
| 10 | | | | 1.537 |
| 11 | 1.51680011 | 1.52237649 | 1.51432243 | 1.627 |
| 12 | | | | 1.678 |
| 13 | | | | 1.976 |

TABLE 20

| Face | K | C1 | C2 | C3 |
|---|---|---|---|---|
| 5 | 0 | 0.003209194 | 0.001700447 | -0.003299476 |
| 6 | 0 | -0.0000224987 | -0.000283158 | 0.00001383485 |
| 7 | 0 | 0.0001490405 | 0.00006260849 | -0.00001149088 |
| 8 | 0 | 0.03997246 | -0.04257866 | 0.1162403 |
| 9 | -10 | -0.5845332 | 0.5997185 | -0.3639181 |
| 10 | -10 | -0.2541873 | 0.2476351 | -0.1603652 |

TABLE 21

| Face | C4 | C5 | C6 |
|---|---|---|---|
| 5 | 0.003429107 | -0.001070669 | 0.00002315036 |
| 6 | 0.00000006672114 | -0.00000002718572 | 0.0000000006906618 |
| 7 | 0.0000006427238 | -0.00000001181276 | -0.00000000000967112 |
| 8 | -0.1287281 | 0.06881615 | -0.01323135 |
| 9 | 0.09883853 | -0.007940074 | 0.0002990768 |
| 10 | 0.06248288 | -0.0141091 | 0.001393133 |

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

1 Optical arrangement
2 Center axis
3 Object side
4 Image side
5 Object/object plane
6 Image plane/detector
10 Catadioptric arrangement
11 First, partly reflective optical component
12 Second, partly reflective optical component
13 Front side
14 Back side
15 Front side
16 Back side
17 Beam path
21 Radially inner region
22 Radially outer region
23 Reflective coating
24 Radially inner region
25 Radially outer region
26 Reflective coating
27 Further optical component
28 Optically transparent cover
29 Optically transparent cover
30 Field lens
31 Inner region
32 Intermediate region
33 Outer region
35 Optical component part for signal separation
40 Device

What is claimed is:

1. An optical arrangement, comprising:
a center axis;
an object side;
an image side;
a catadioptric arrangement;
the catadioptric arrangement comprising a first, partly reflective optical component and a second, partly reflective optical component, which are arranged in succession in the beam path along the center axis such that the first, partly reflective optical component is arranged on the image side of the second, partly reflective optical component;
the first, partly reflective optical component comprising a first radially inner region and a first radially outer region in relation to the center axis, the first radially inner region being configured to be at least partly transparent to light incident from the object side, and the first radially outer region being configured to reflect light incident from the object side, wherein the first, partly reflective optical component is a first lens, and wherein the first radially inner region and the first radially outer region are made of a same first material;
the second, partly reflective optical component comprising a second radially inner region and a second radially outer region in relation to the center axis, the second radially outer region being configured to be transparent to light incident from the object side, and the second radially inner region being configured to be at least partly transparent to light incident from the object side and to reflect light incident from the image side, wherein the second, partly reflective optical component is a second lens, and wherein the second radially inner region and the second radially outer region are made of a same second material; and
at least one further optical component with positive refractive power being arranged only at the second radially inner region of the second, partly reflective optical component on the object side.

2. The optical arrangement as claimed in claim 1, wherein the further optical component has a positive refractive power in the range of $L/4 < f1 < L/1.5$, where L is the vertex distance of an object-side face of the further optical component from an image plane and f1 is the focal length of the further optical component.

3. The optical arrangement as claimed in claim 1, wherein the further optical component is applied to the second radially inner region of the second, partly reflective optical component at an object-side front side of the second, partly reflective optical component.

4. The optical arrangement as claimed in claim 1, wherein the further optical component comprises a plurality of lenses.

5. The optical arrangement as claimed in claim 1, wherein the second radially inner region of the second, partly reflective optical component is configured as a beam splitter, and
wherein the beam splitter is configured to be at least partly transparent to light incident from the object side and to partly reflect light incident from the image side.

6. The optical arrangement as claimed in claim 1, wherein the optical arrangement further comprises an optical component part configured to be switchable between a transmitting and a reflecting state and to control the transmission and/or reflection of light by the second radially inner region and the second radially outer region of the second optical component.

7. The optical arrangement as claimed in claim 6, wherein the optical component part comprises a plurality of regions which are arranged radially with respect to one another in relation to the center axis and which can each be switched independently of one another between a transmitting state and an opaque state.

8. The optical arrangement as claimed in claim 1, wherein the second radially inner region of the second, partly reflective optical component is configured such that the second radially inner region of the second, partly reflective optical component reflects light of a first defined wavelength range and transmits light of a second defined wavelength range.

9. The optical arrangement as claimed in claim 1, wherein the second radially inner region of the second, partly reflective optical component is configured such that the second radially inner region of the second, partly reflective optical component reflects light of a first defined polarization state and transmits light of a second defined polarization state.

10. The optical arrangement as claimed in claim 1, wherein the second radially inner region of the second, partly reflective optical component has a third radially outer region which is configured as an aperture stop.

11. The optical arrangement as claimed in claim 1, wherein the optical arrangement has a linear obscuration of between 30 percent and 50 percent.

12. The optical arrangement as claimed in claim 1, wherein the optical arrangement is configured to be switchable between a first state and a second state and the object-side chief ray angle is at least two times larger in the second state than in the first state.

13. An objective comprising an optical arrangement as claimed in claim 1.

14. An image capture apparatus or image reproduction apparatus comprising the objective as claimed in claim 13.

15. A device, comprising:
   the optical arrangement as claimed in claim 1,
   wherein the optical arrangement further comprises an image capture apparatus.

16. The device as claimed in claim 15, wherein the device is a microscope or a mobile device, and
   wherein the image capture apparatus is a camera.

17. The optical arrangement as claimed in claim 1, wherein the second radially inner region and the second radially outer region of the second, partly reflective optical component are fixedly arranged relative to one another.

18. The optical arrangement as claimed in claim 1, wherein the second radially inner region of the second, partly reflective optical component is configured to be simultaneously (1) at least partly transparent to light incident from the object side and (2) to reflect light incident from the image side.

\* \* \* \* \*